(12) United States Patent
Kovak et al.

(10) Patent No.: US 8,408,026 B2
(45) Date of Patent: Apr. 2, 2013

(54) LIQUID COLLECTOR AND REDISTRIBUTOR FOR PACKED COLUMNS

(75) Inventors: Kenneth William Kovak, Macungie, PA (US); Clive Chalk, Owestry (GB); Stephen Graham Sawyer, Epsom (GB)

(73) Assignee: Air Products and Chemicals, Inc., Allentown, PA (US)

( * ) Notice: Subject to any disclaimer, the term of this patent is extended or adjusted under 35 U.S.C. 154(b) by 1273 days.

(21) Appl. No.: 11/842,220

(22) Filed: Aug. 21, 2007

(65) Prior Publication Data

US 2009/0049864 A1    Feb. 26, 2009

(51) Int. Cl.
*F25J 3/00* (2006.01)
*F02M 17/28* (2006.01)
*F02M 29/04* (2006.01)
*C10J 1/08* (2006.01)
*B21D 39/03* (2006.01)
*B01D 3/14* (2006.01)

(52) U.S. Cl. .......... 62/643; 62/905; 261/96; 261/97; 261/110; 261/114.1; 261/114.2; 261/114.5; 29/428; 202/158

(58) Field of Classification Search .......... 62/643, 62/905; 261/96, 97
See application file for complete search history.

(56) References Cited

U.S. PATENT DOCUMENTS

| | | | |
|---|---|---|---|
| 2,823,075 A * | 2/1958 | Shirley .......... | 239/520 |
| 3,222,040 A | 12/1965 | Eckert | |
| 4,087,252 A * | 5/1978 | Strahorn et al. .......... | 422/231 |
| 4,432,913 A * | 2/1984 | Harper et al. .......... | 261/97 |
| 4,476,069 A | 10/1984 | Harper et al. | |
| 4,744,929 A | 5/1988 | Robinson et al. | |
| 4,820,455 A | 4/1989 | Kunesh et al. | |
| 5,061,407 A * | 10/1991 | Nutter .......... | 261/96 |
| 5,069,830 A | 12/1991 | Moore et al. | |
| 5,132,055 A | 7/1992 | Alleaume et al. | |
| 5,224,351 A | 7/1993 | Jeannot et al. | |
| 5,240,652 A * | 8/1993 | Taylor et al. .......... | 261/97 |
| 5,281,369 A | 1/1994 | Pluss | |
| 5,453,222 A | 9/1995 | Lee et al. | |
| 5,510,061 A | 4/1996 | Moore | |
| 5,518,667 A * | 5/1996 | Lehman .......... | 261/97 |
| 5,667,643 A * | 9/1997 | Satchell et al. .......... | 202/154 |

(Continued)

FOREIGN PATENT DOCUMENTS

EP    0 257 152 A1    3/1988
EP    1390110 B1    1/2005

(Continued)

*Primary Examiner* — Marc Norman
*Assistant Examiner* — Filip Zec
(74) *Attorney, Agent, or Firm* — Eric J. Schaal; Willard Jones, II

(57) ABSTRACT

An apparatus for collecting/redistributing a flow of liquid descending in an exchange column containing a layer of packing that includes: a plurality of horizontally spaced longitudinal members, each member having an inner side and an upper end adjacent a bottom of the layer of packing; at least one plate vertically spaced from the bottom of the layer of packing, each plate adapted to collect a portion of the flow of the descending liquid and having opposing ends connected to the inner sides of a pair of the longitudinal members; and at least one vapor riser in fluid communication with the plate and adapted to receive and transmit at least a portion of a stream of a vapor ascending in the exchange column from below to above the plate, each vapor riser having a cap vertically spaced apart from the bottom of the layer of packing.

20 Claims, 5 Drawing Sheets

U.S. PATENT DOCUMENTS

| | | | |
|---|---|---|---|
| 5,752,538 A * | 5/1998 | Billingham et al. | 137/1 |
| 5,770,165 A | 6/1998 | Truppi et al. | |
| 5,785,900 A | 7/1998 | Belot et al. | |
| 5,814,249 A | 9/1998 | Dolan | |
| 6,086,055 A | 7/2000 | Armstrong et al. | |
| 6,536,233 B2 * | 3/2003 | Darredeau et al. | 62/643 |
| 6,749,182 B1 * | 6/2004 | Larson et al. | 261/97 |
| 7,007,932 B2 | 3/2006 | Armstrong et al. | |
| 7,118,098 B2 | 10/2006 | Thiel et al. | |

FOREIGN PATENT DOCUMENTS

| | | |
|---|---|---|
| JP | 59-162901 A | 9/1984 |
| JP | 09-075712 A | 3/1997 |
| JP | 10-137531 A | 5/1998 |
| JP | 2000-107503 A | 4/2000 |
| JP | 2002-181445 A | 6/2002 |
| JP | 2003-299902 A | 10/2003 |
| JP | 2004-305975 A | 11/2004 |
| RU | 2 134 138 | 8/1999 |
| RU | 2 297 266 C2 | 4/2007 |
| SU | 1029973 A | 7/1983 |
| SU | 1101250 A | 7/1984 |

* cited by examiner

LIQUID COLLECTOR AND REDISTRIBUTOR FOR PACKED COLUMNS

BACKGROUND OF THE INVENTION

The present invention relates to devices and methods for collecting and redistributing liquid descending in packed exchange columns for heat and/or mass transfer processes. The invention has particular application in cryogenic air separation processes utilizing distillation, although it also may be used in other heat and/or mass transfer processes which use packing (e.g., random or structured packing). The present invention also relates to methods for assembling devices for collecting and redistributing liquid descending in packed exchange columns.

As used herein, the term "column" (or "exchange column") means a distillation or fractionation column or zone, i.e., a column or zone where liquid and vapor phases are countercurrently contacted to effect separation of a fluid mixture, such as by contacting of the vapor and liquid phases on packing elements or on a series of vertically-spaced trays or plates mounted within the column.

The term "packing" means solid or hollow bodies of predetermined size, shape, and configuration used as column internals to provide surface for the liquid to allow mass transfer at the liquid-vapor interface during countercurrent flow of two phases. Two broad classes of packings are "random" and "structured."

"Random packing" means packing wherein individual members do not have any particular orientation relative to each other or to the column axis. Random packings are small, hollow structures with large surface area per unit volume that are loaded at random into a column.

"Structured packing" means packing wherein individual members have specific orientation relative to each other and to the column axis. Structured packings usually are made of thin metal foil, expanded metal, or woven wire screen stacked in layers or as spiral bindings; however, other materials of construction, such as plain sheet metal, may be used.

In processes such as distillation or direct contact cooling, it is advantageous to use structured packing to promote heat and mass transfer between counter-flowing liquid and vapor streams. Structured packing, when compared with random packing or trays, offers the benefits of higher efficiency for heat and mass transfer with lower pressure drop. Structured packing also has more predictable performance than random packing.

Cryogenic separation of air is carried out by passing liquid and vapor in countercurrent contact through a distillation column. A vapor phase of the mixture ascends with an ever increasing concentration of the more volatile components (e.g., nitrogen) while a liquid phase of the mixture descends with an ever increasing concentration of the less volatile components (e.g., oxygen).

Various packings or trays may be used to bring the liquid and gaseous phases of the mixture into contact to accomplish mass transfer between the phases. The use of packing for distillation is standard practice and has many advantages where pressure drop is important.

Initial presentation of liquid and vapor to the packing is usually made by means of distributors. A liquid distributor, the role of which is to irrigate the packing substantially uniformly with liquid, is located above the packing, while a vapor distributor, the role of which is to create substantially uniform vapor flow below the packing, is located below the packing. In addition to the vapor distributor, a liquid collector is also located below the packing, the role of which is to collect all the liquid leaving the packing and direct it further down the column. It is common for the liquid collector and the vapor distributor to be encompassed in the same device, which performs both roles.

U.S. Pat. No. 4,744,929 (Robinson, et al.) entitled "Support Device for a Packed Column" discloses a support device for a packed column. The support device is intended to function both as a support device for the packing material and as a collector for descending liquid.

The prior art includes many other devices for collecting and redistributing liquid in packed columns. Generally, these devices include independent pieces of equipment which need to be supported at specific locations in the column and which take up space (height) within the column, making the column taller. This results in increased costs for fabrication, transportation, installation, and operation of the column.

It is desired to have an apparatus and a method for collecting and redistributing a flow of a liquid descending in an exchange column which require relatively little additional column height and associated costs.

It is further desired to have an apparatus and method for collecting and redistributing a flow of a liquid descending in an exchange column in which the liquid collector is easily integrated with the support grates or other members.

It is still further desired to have a new, more efficient apparatus and method for collecting and redistributing a flow of liquid descending in an exchange column.

It is still further desired to have an apparatus and a method which effectively distribute vapor while collecting and redistributing a flow of liquid descending in an exchange column.

It is still further desired to have an apparatus and a method for collecting and redistributing a flow of liquid descending in an exchange column which overcome the difficulties, problems, limitations, disadvantages, and deficiencies of the prior art to provide better and more advantageous results.

It is also desired to have a method for assembling an apparatus for collecting and redistributing a flow of a liquid descending in an exchange column which affords better liquid distribution than the prior art, and which also overcomes many of the difficulties and disadvantages of the prior art to provide better and more advantageous results.

BRIEF SUMMARY OF THE INVENTION

The invention is an apparatus and a method for collecting and redistributing a flow of a liquid descending in an exchange column. The invention also includes a method for assembling such an apparatus.

There are several aspects of the apparatus and variations thereof. In a first aspect, the apparatus for collecting and redistributing a flow of a liquid descending in an exchange column having a longitudinal axis and a cross-sectional area, the exchange column containing a layer of packing having a top and a bottom opposite the top, the bottom of the layer of packing extending across at least a portion of the cross-sectional area of the exchange column, includes three elements. The first element is a plurality of horizontally spaced apart longitudinal members, including at least one pair of longitudinal members which includes a first longitudinal member and a second longitudinal member horizontally spaced apart from the first longitudinal member. Each longitudinal member extends across at least a portion of the cross-sectional area of the exchange column and has at least one inner side, an upper end adjacent the bottom of the layer of packing, and a lower end opposite the upper end. The second element is at least one plate vertically spaced apart from the bottom of the layer of packing and extending across at least a portion of the cross-sectional area of the exchange column. The plate is adapted to collect a first portion of the flow of the liquid descending in the exchange column and has a first end and a second end opposite the first end. The first end of the plate is connected to the inner side of the first longitudinal member and the second end of the plate is connected to the inner side of the second longitudinal member. The third element is at least one vapor riser in fluid communication with the plate and adapted to receive and transmit at least a portion of a stream of a vapor ascending in the exchange column from a first location below the plate to a second location above the plate. The vapor riser has a cap vertically spaced apart from the bottom of the packing, at least one upright wall connected to the plate and projecting upward above the plate and connecting to the cap, and at least one opening adapted to transmit at least a portion of the stream of the vapor outward from the vapor riser.

There are several variations of the first aspect of the apparatus. In one variation, the at least one opening in the vapor riser comprises at least one aperture in the at least one upright wall of the vapor riser. In another variation, at least one of the first longitudinal member and the second longitudinal member structurally supports at least a portion of the layer of packing.

In another variation, the cap is adapted to receive a second portion of the flow of the liquid descending in the exchange column and to deflect at least a substantial portion of the second portion of the flow of liquid downwardly to the plate. In yet another variation, the cap includes a collecting channel adapted to receive and collect a second portion of the flow of the liquid descending in the exchange column.

A second aspect of the apparatus is similar to the first aspect described above, but includes an additional element. The additional element is at least one transfer channel extending across at least a portion of the cross-sectional area of the exchange column, the at least one transfer channel adapted to receive and transmit a flow of at least a portion of the liquid collected on the at least one plate. In a variant of that variation, the at least one transfer channel includes an annular-shaped channel having an outer perimeter less than or equal to an inner perimeter of the exchange column.

A third aspect of the apparatus is similar to the second aspect of the apparatus, but includes an additional element. The additional element is at least one conduit in fluid communication with the at least one transfer channel, the at least one conduit adapted to receive and transmit at least a portion of the collected liquid from the at least one transfer channel downward in the exchange column.

Another aspect of the invention is a method for collecting and redistributing a descending flow of a liquid and an ascending flow of a vapor in an exchange column having a longitudinal axis and a cross-sectional area. The exchange column contains a layer of packing having a top and a bottom opposite the top. The bottom of the layer of packing extends across at least a portion of the cross-sectional area of the exchange column. A first aspect of the method includes multiple steps. The first step is to introduce the descending flow of the liquid into an upper portion of the exchange column. The second step is to introduce the ascending flow of the vapor into a lower portion of the exchange column. The third step is to position within the exchange column an apparatus including the three elements described above in the first aspect of the apparatus. The fourth step is to pass the at least a portion of the stream of the vapor from the lower portion of the column to the first location below the plate near the at least one vapor riser.

There are many variations of the first aspect of the method. In one variation, the at least one opening in the vapor riser includes at least one aperture in the at least one upright wall of the vapor riser. In another variation, at least one of the longitudinal member and the second longitudinal member structurally supports at least a portion of the layer of packing.

In another variation of the first aspect of the method, the cap is adapted to receive a second portion of the flow of the liquid descending in the exchange column and to deflect at least a substantial portion of the second portion of the flow of the liquid downwardly to the plate. In yet another variation, the cap includes a collecting channel adapted to receive and collect a second portion of the flow of the liquid descending in the exchange column.

A second aspect of the method is similar to the first aspect of the method, but includes two additional steps. The first additional step is to provide at least one transfer channel extending across at least a portion of the cross-sectional area of the exchange column, the at least one transfer channel adapted to receive and transmit a flow of at least a portion of the liquid collected on the at least one plate. The second additional step is to distribute the flow of at least a portion of the liquid collected on the at least one plate to the at least one transfer channel. In a variation of the second aspect of the method, the at least one transfer channel includes an annular-shaped channel having an outer perimeter less than or equal to an inner perimeter of the exchange column.

A third aspect of the method is similar to the second aspect of the method, but includes three additional steps. The first additional step is to provide at least one conduit in fluid communication with the at least one transfer channel, the at least one conduit adapted to receive and transmit at least a portion of the collected liquid from the at least one transfer channel downward in the exchange column. The second additional step is to transmit to the at least one conduit a flow of at least a portion of the collected liquid distributed to the at least one transfer channel. The third additional step is to transmit in the at least one conduit at least a portion of the collected liquid received from the at least one transfer channel downward in the exchange column.

Another aspect of the invention is a method for assembling an apparatus for collecting and redistributing a flow of a liquid descending in an exchange column. A first aspect of the method for assembling includes multiple steps. The first step is to provide the exchange column having a longitudinal axis and a cross-sectional area, the exchange column containing a layer of packing having a top and a bottom opposite the top, the bottom of the layer of packing extending across at least a portion of the cross-sectional area of the exchange column. The second step is to provide in the exchange column a plurality of horizontally spaced apart longitudinal members, including at least one pair of longitudinal members which include a first longitudinal member and a second longitudinal member horizontally spaced apart from the first longitudinal member. Each longitudinal member extends across at least a portion of the cross-sectional area of the exchange column and has at least one inner side, an upper end adjacent the bottom of the layer of packing, and a lower end opposite the upper end.

A third step is to provide in the exchange column at least one plate vertically spaced apart from the bottom of the layer of packing and extending across at least a portion of the cross-sectional area of the exchange column. The plate is adapted to collect a first portion of the flow of the liquid descending in the exchange column and has a first end and a second end opposite the first end. The first end of the plate is connected to the inner side of the first longitudinal member and the second end of the plate is connected to the inner side of the second longitudinal member.

The fourth step is to provide in the exchange column at least one vapor riser in fluid communication with the plate and adapted to receive and transmit at least a portion of a stream of a vapor ascending in the exchange column from a first location below the plate to a second location above the plate. The vapor riser has a cap vertically spaced apart from the bottom of the packing, at least one upright wall connected to the plate and projecting upward above the plate and connecting to the cap, and at least one opening adapted to transmit at least a portion of the stream of the vapor outward from the vapor riser.

In a variation of the first aspect of the method for assembling, at least one of the first longitudinal member and the second longitudinal member structurally supports at least a portion of the layer of packing.

A second aspect of the method for assembling an apparatus is similar to the first aspect of the method for assembling, but includes an additional step. The additional step is to provide in the exchange column at least one transfer channel extending across at least a portion of the cross-sectional area of the exchange column, the at least one transfer channel adapted to receive and transmit a flow of at least a portion of the liquid collected on the at least one plate.

A third aspect of the method for assembling an apparatus is similar to the second aspect of the method for assembling, but includes an additional step. The additional step is to provide in the exchange column at least one conduit in fluid communication with the at least one transfer channel, the at least one conduit adapted to receive and transmit at least a portion of a collected liquid from the at least one transfer channel downward in the exchange column.

BRIEF DESCRIPTION OF SEVERAL VIEWS OF THE DRAWINGS

The invention will be described by way of example with reference to the accompanying drawings, in which.

DETAILED DESCRIPTION OF THE INVENTION

Figure 1:
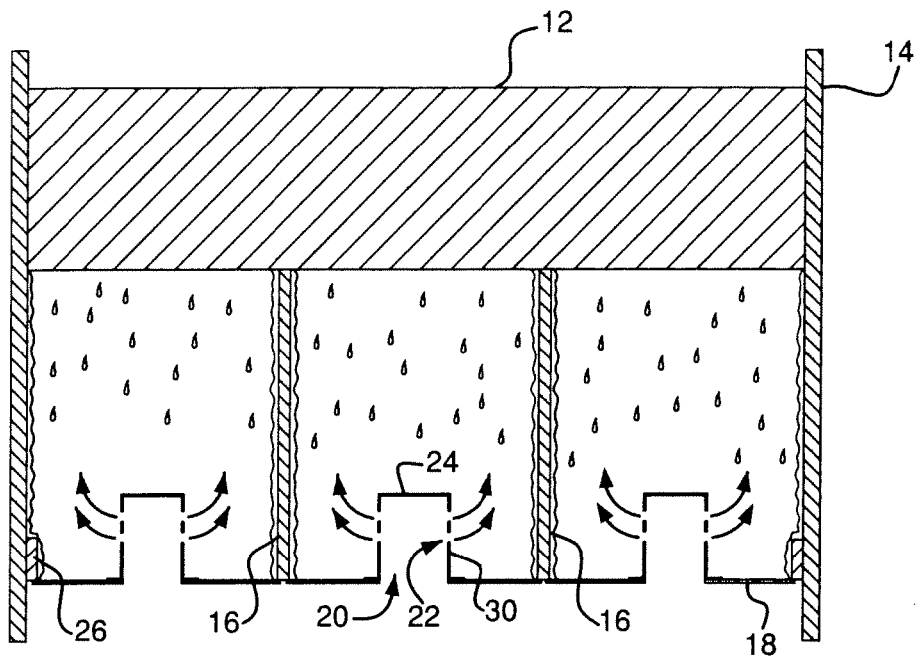
FIG. 1 is a schematic diagram of a cross-sectional elevation view of one embodiment of the invention.
Figure 2:
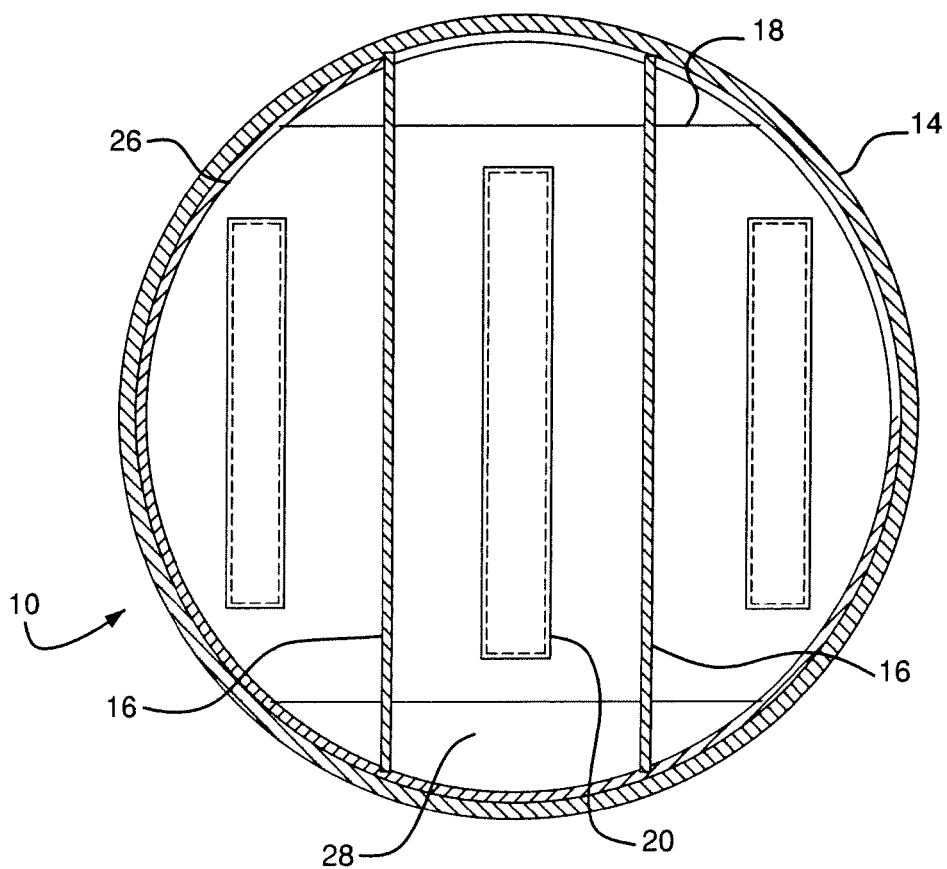
FIG. 2 is a schematic diagram of a cross-sectional plan view of one embodiment of the invention.
Figure 4:
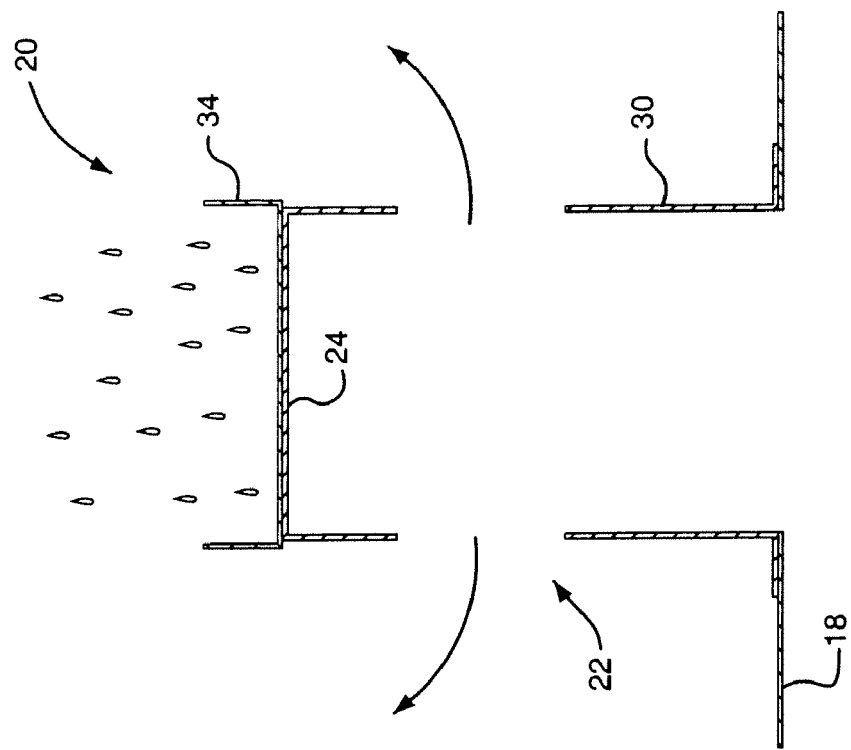
FIG. 4 is a cross-sectional elevation view of another type of vapor riser for another embodiment of the invention.
Figure 5:
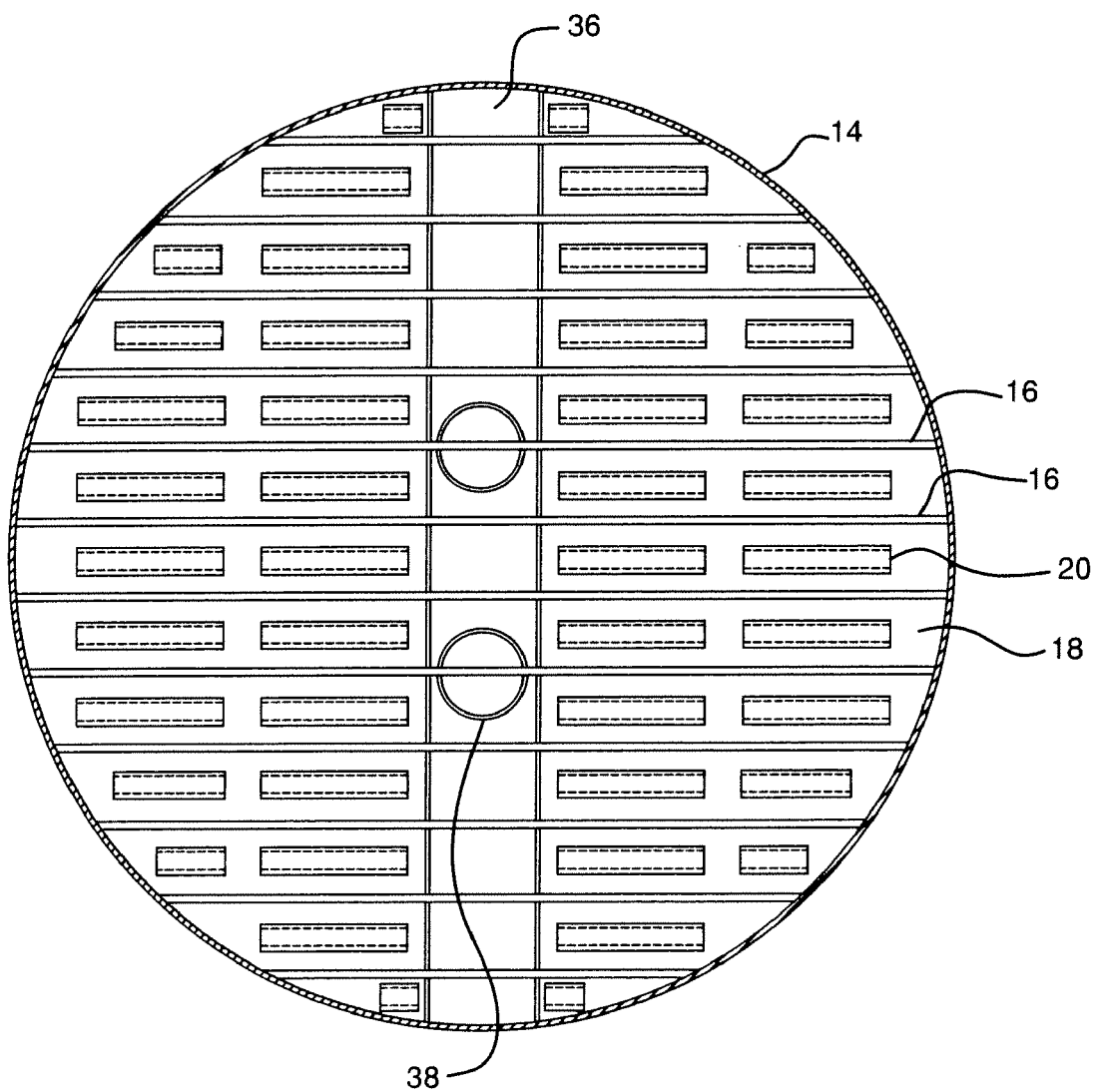
FIG. 5 is a schematic diagram of a cross-sectional plan view of a column containing another embodiment of the invention.
Figure 6:
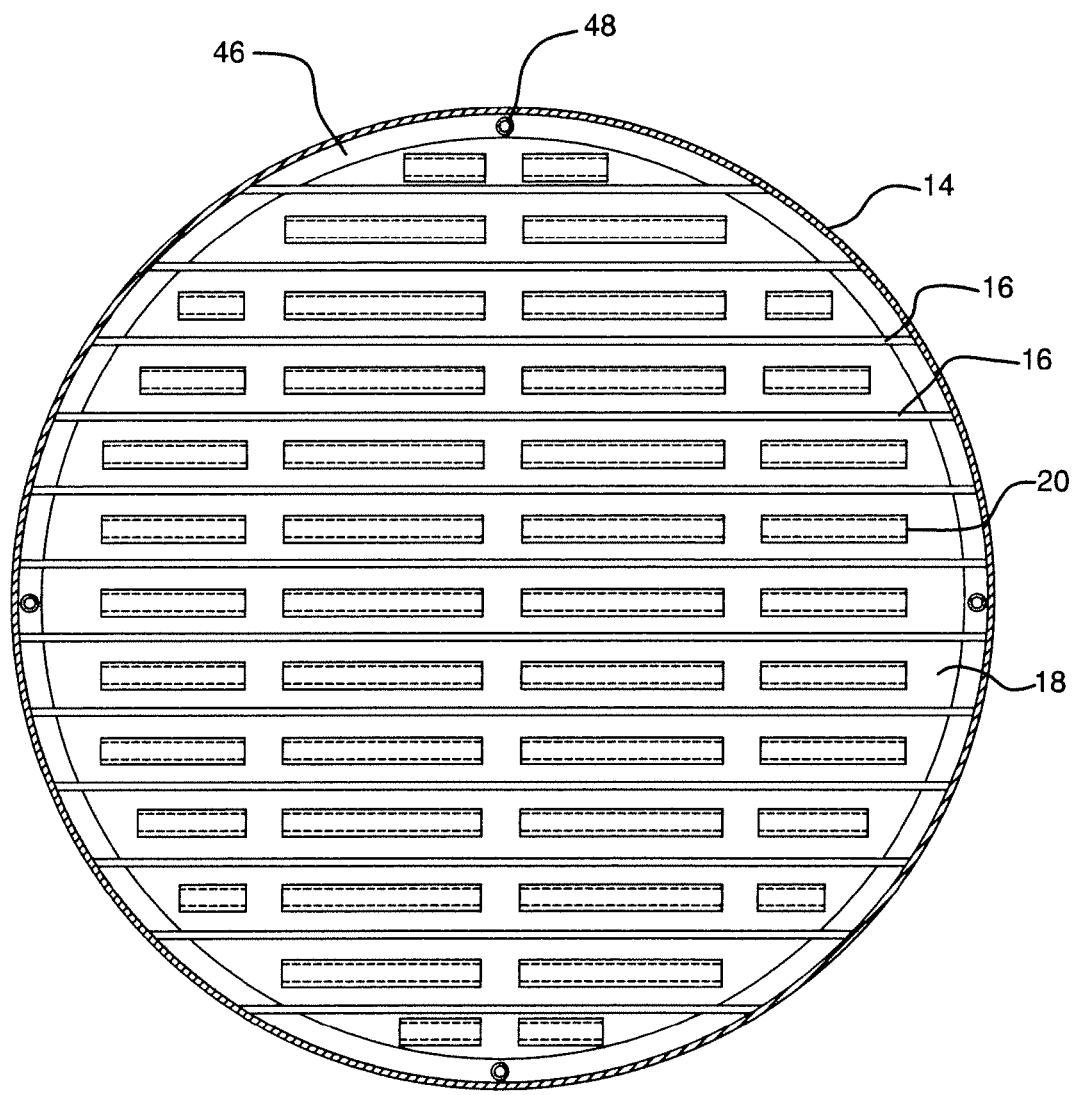
FIG. 6 is a schematic diagram of a cross-sectional plan view of an exchange column containing another embodiment of the invention.
Figure 7:
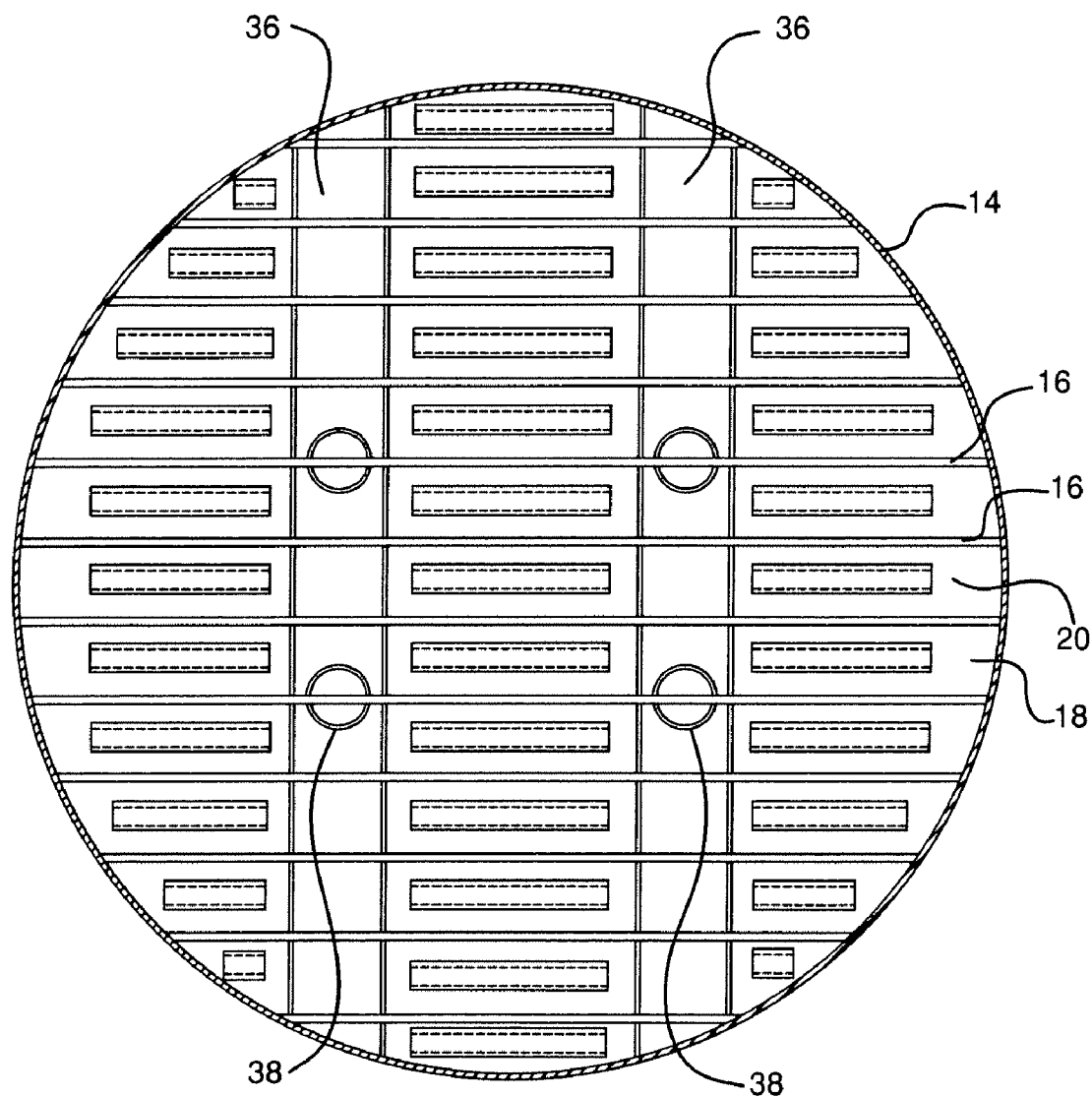
FIG. 7 is a schematic diagram of a cross-sectional plan view of a column containing another embodiment of the invention.

FIGS. 1-7 illustrate several embodiments of the apparatus and method for collecting and distributing a liquid descending in an exchange column. FIGS. 1 and 2 illustrate an embodiment of the apparatus in an exchange column having a small diameter, while FIGS. 5-7 illustrate several embodiments of the apparatus in large-diameter exchange columns. Persons skilled in the art will recognize that many other embodiments incorporating the inventive concept are possible, as well as many variations of the embodiments illustrated and described herein.

Referring to FIGS. 1 and 2, an apparatus 10 for collecting and redistributing a flow of liquid descending in an exchange column 14 is shown. The exchange column contains a layer of packing 12. Although the apparatus and method are discussed herein in connection with structured packing, persons skilled in the art will recognize that the apparatus and method also may be used with other types of packing (e.g., random packing).

The layer of packing 12 is supported by support grates 16, which typically are elongated metal members extending across the cross-sectional area of the exchange column 14. A deck or plate 18 (e.g., a flat metal plate) is placed between the support grates 16 and is connected to each support grate 16 by welding or other fastening means. The plate 18 also extends from the support grates 16 to the inner wall of the exchange column 14 where it is connected to the inner wall by connecting means 26.

Included in the plate is a vapor riser 20. Persons skilled in the art will recognize that the vapor riser may take many shapes or forms. The vapor riser shown has spaced apart upright walls 30 fastened to the plate 18. A cap 24 at the top of the vapor riser connects the upright walls, which are perforated such that vapor rising in the exchange column and entering the vapor riser may pass through the apertures 22 and continue rising upward to eventually enter the layer of packing 12.

As shown in FIG. 1, most of the liquid passing through the layer of packing 12 rains down through the open area above the plate 18. However, as shown in the schematic illustration, some of the liquid flows down along the inner walls of the exchange column 14 and along both sides of the support grates 16.

Figure 3:
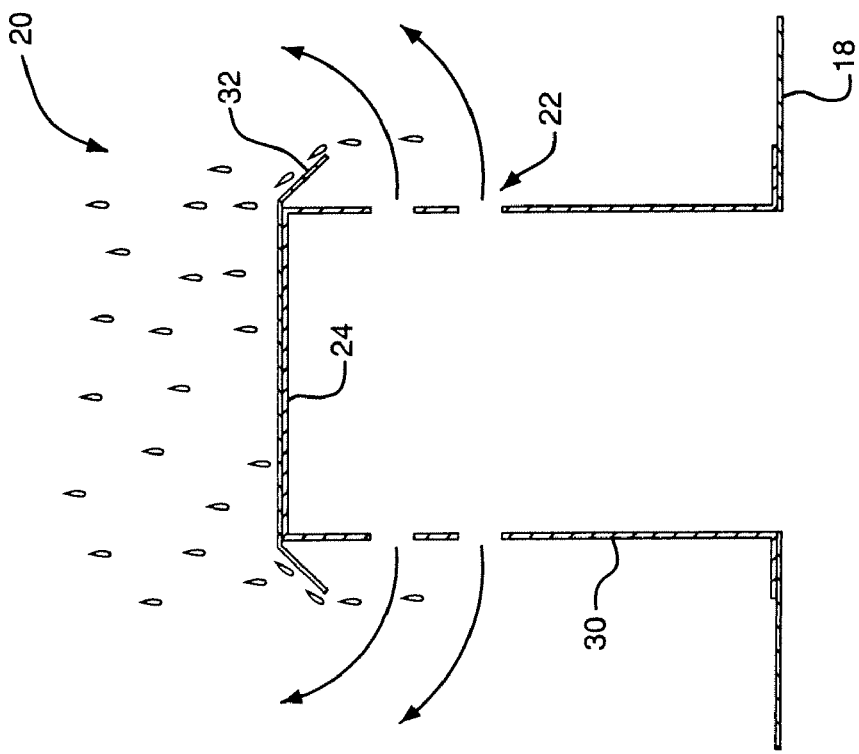
FIG. 3 is a cross-sectional elevation view of one type of vapor riser for one embodiment of the invention.

Although most of the liquid which rains downward falls on the plate 18, a portion of the descending liquid falls on the caps 24 of the vapor risers 20. FIG. 3 illustrates one variation where the cap has extensions 32 angled downward to deflect liquid downwardly to the plate. FIG. 4 shows another variation where the cap is in the form of a channel having spaced apart upright channel walls 34. The liquid collected in the channel may flow from one or both ends of the channel atop the vapor riser 20 downward to the plate 18. Persons skilled in the art will recognize that there may be other shapes of the cap and means for transmitting liquid from the cap to the plate below.

The liquid collected on the plate 18 is transmitted from the plate downward in the exchange column 14. FIG. 2 and FIGS. 5-7 show several embodiments having various means for accomplishing this. The liquid is then directed to a sump (not shown) or to a distributor below (not shown).

In FIG. 2, the liquid flows to either end of the tray 18 and falls into downcomer 28. Persons skilled in the art will recognize that other variations are possible with respect to the size, shape, location, arrangement, and number of the downcomers.

As shown in the embodiment illustrated in FIG. 5, a channel 36 extending across the cross-sectional area of the exchange column 14 receives liquid flowing from the plates 18 on both sides of the channel. One or more downcomers 38 receive the liquid collected in the channel 36 and transmit that liquid downward in the exchange column.

In the embodiment illustrated in FIG. 6, an annular-shaped channel (gutter) 46 receives the collected liquid from the trays 18. The liquid received in the annular-shaped channel is transmitted downward through downcomers 48 positioned at various locations, as shown in FIG. 6. Preferably, the annular-shaped channel is continuous and adjacent the perimeter of the inner wall of the exchange column 14, as shown in FIG. 6. However, persons skilled in the art will recognize that the annular-shaped channel need not be continuous nor adjacent the inner wall of the exchange column, and that various other arrangements are possible.

FIG. 7 shows another possible arrangement of multiple channels 36 and downcomers 38 for receiving liquid collected on plates 18 and transmitting the liquid downward in the exchange column 14 through the downcomers. FIG. 7 shows two spaced apart channels 36 having equal dimensions which are parallel to and equidistant from the diameter of the exchange column. Persons skilled in the art will recognize, however, that many other arrangements and variations are possible.

The downcomers 38 in both FIG. 5 and FIG. 7 are illustrated as circular conduits positioned at the locations shown relative to the diameter of the exchange column 14. However, persons skilled in the art will recognize that the downcomers may have other shapes and/or be positioned at other locations.

Also, in the preferred embodiment, the plates 18 are integrated with the support grates 16, which provide structural support for the layer of packing 12. However, other designs are possible. For example, the plate(s) may be connected to other elongated members disposed within the exchange column 14, which elongated members extend upward from the plate(s) to or near the bottom of the layer of packing. Persons skilled in the art will recognize that various other arrangements are possible, including various combinations (e.g., some elongated members provide structural support, while other elongated members do not provide structural support).

By integrating the liquid collector with the support grates (and/or other members), the column height taken up by the apparatus is less than the height taken up by that of prior art liquid collectors, and the relative cost of the equipment is less. The net result of a shorter exchange column results in less cost for fabrication, transportation, installation, and operation of the column. In addition to being less expensive and easier to fabricate, the liquid collector/redistributor provides good operability at low turndowns and operates satisfactorily across the entire flow regime of an exchange column used in air separation distillation.

Although illustrated and described herein with reference to certain specific embodiments, the present invention is nevertheless not intended to be limited to the details shown and described. Rather, various modifications may be made in the details within the scope and range of equivalents of the claims and without departing from the spirit of the invention.

The invention claimed is:

1. An apparatus for collecting and redistributing a flow of a liquid descending in an exchange column having a longitudinal axis and a cross-sectional area, the exchange column containing a layer of packing having a top and a bottom opposite the top, the bottom of the layer of packing extending across at least a portion of the cross-sectional area of the exchange column, comprising:
   a plurality of horizontally spaced apart longitudinal members, including at least one pair of longitudinal members comprising a first longitudinal member and a second longitudinal member horizontally spaced apart from the first longitudinal member, each longitudinal member extending across at least a portion of the cross-sectional area of the exchange column and having at least one inner side, an upper end adjacent the bottom of the layer of packing, and a lower end opposite the upper end;
   at least one plate vertically spaced apart from the bottom of the layer of packing and extending across at least a portion of the cross-sectional area of the exchange column to collect a first portion of the flow of the liquid descending in the exchange column and having a first end and a second end opposite the first end, the first end of the at least one plate being connected to the inner side of the first longitudinal member and the second end of the at least one plate being connected to the inner side of the second longitudinal member; and
   at least one vapor riser in fluid communication with the plate to receive and transmit at least a portion of a stream of a vapor ascending in the exchange column from a first location below the at least one plate to a second location above the at least one plate, the at least one vapor riser having a cap vertically spaced apart from the bottom of the packing, at least one upright wall connected to the at least one plate and projecting upward above the at least one plate and connecting to the cap, and at least one opening to transmit at least a portion of the stream of the vapor outward from the at least one vapor riser at least one of the at least one plate is connected to an inner wall of the exchange column.

2. An apparatus as in claim 1, wherein the at least one opening in the at least one vapor riser comprises at least one aperture in the at least one upright wall of the at least one vapor riser.

3. An apparatus as in claim 1, wherein the cap is adapted to receive a second portion of the flow of the liquid descending in the exchange column and to deflect at least a substantial portion of the second portion of the flow of the liquid downwardly to the plate.

4. An apparatus as in claim 1, wherein the cap comprises a collecting channel to receive and collect a second portion of the flow of the liquid descending in the exchange column.

5. An apparatus as in claim 1, wherein at least one of the first longitudinal member and the second longitudinal member structurally supports at least a portion of the layer of packing.

6. An apparatus as in claim 1, further comprising at least one transfer channel extending across at least a portion of the cross-sectional area of the exchange column, to receive and transmit a flow of at least a portion of the liquid collected on the at least one plate.

7. An apparatus as in claim 6, wherein the at least one transfer channel includes an annular-shaped channel having an outer perimeter less than or equal to an inner perimeter of the exchange column.

8. An apparatus as in claim 6, further comprising at least one conduit in fluid communication with the at least one transfer channel to receive and transmit at least a portion of the collected liquid from the at least one transfer channel downward in the exchange column.

9. A method for collecting and redistributing a descending flow of a liquid and an ascending flow of a vapor in an exchange column having a longitudinal axis and a cross-sectional area, the exchange column containing a layer of packing having a top and a bottom opposite the top, the bottom of the layer of packing extending across at least a portion of the cross-sectional area of the exchange column, comprising the steps of:
   introducing the descending flow of the liquid into an upper portion of the exchange column;
   introducing the ascending flow of the vapor into a lower portion of the exchange column;
   positioning within the exchange column an apparatus comprising:

a plurality of horizontally spaced apart longitudinal members, including at least one pair of longitudinal members comprising a first longitudinal member and a second longitudinal member horizontally spaced apart from the first longitudinal member, each longitudinal member extending across at least a portion of the cross-sectional area of the exchange column and having at least one inner side, an upper end adjacent the bottom of the layer of packing, and a lower end opposite the upper end;

at least one plate vertically spaced apart from the bottom of the layer of packing and extending across at least a portion of the cross-sectional area of the exchange column to collect a first portion of the flow of the liquid descending in the exchange column and having a first end and a second end opposite the first end, the first end of the at least one plate being connected to the inner side of the first longitudinal member and the second end of the at least one plate being connected to the inner side of the second longitudinal member; and at least one vapor riser in fluid communication with the plate to receive and transmit at least a portion of a stream of the vapor ascending in the exchange column from a first location below the at least one plate to a second location above the at least one plate, the at least one vapor riser having a cap vertically spaced apart from the bottom of the packing, at least one upright wall connected to the at least one plate and projecting upward above the at least one plate and connecting to the cap, and at least one opening to transmit at least a portion of the stream of the vapor outward from the at least one vapor riser;

collecting the first portion of the flow of the liquid on the at least one plate; and passing the at least a portion of the stream of the vapor from the lower portion of the column to the first location below the at least one plate near the at least one vapor riser connecting at least one of the at least one plate to an inner wall of the exchange column.

10. A method as in claim 9, wherein the at least one opening in the at least one vapor riser comprises at least one aperture in the at least one upright wall of the at least one vapor riser.

11. A method as in claim 9, wherein the cap is adapted to receive a second portion of the flow of the liquid descending in the exchange column and to deflect at least a substantial portion of the second portion of the flow of the liquid downwardly to the plate.

12. A method as in claim 9, wherein the cap comprises a collecting channel to receive and collect a second portion of the flow of the liquid descending in the exchange column.

13. A method as in claim 9, wherein at least one of the first longitudinal member and the second longitudinal member structurally supports at least a portion of the layer of packing.

14. A method as in claim 9, comprising the further steps of:
providing at least one transfer channel extending across at least a portion of the cross-sectional area of the exchange column to receive and transmit a flow of at least a portion of the liquid collected on the at least one plate; and distributing the flow of at least a portion of the liquid collected on the at least one plate to the at least one transfer channel.

15. A method as in claim 14, wherein the at least one transfer channel includes an annular-shaped channel having an outer perimeter less than or equal to an inner perimeter of the exchange column.

16. A method as in claim 14, comprising the further steps of:
providing at least one conduit in fluid communication with the at least one transfer channel to receive and transmit at least a portion of the collected liquid from the at least one transfer channel downward in the exchange column;

transmitting to the at least one conduit the flow of at least a portion of the collected liquid distributed to the at least one transfer channel; and transmitting in the at least one conduit at least a portion of the collected liquid received from the at least one transfer channel downward in the exchange column.

17. A method for assembling an apparatus for collecting and redistributing a flow of a liquid descending in an exchange column, comprising the steps of:
providing the exchange column having a longitudinal axis and a cross-sectional area, the exchange column containing a layer of packing having a top and a bottom opposite the top, the bottom of the layer of packing extending across at least a portion of the cross-sectional area of the exchange column;

providing in the exchange column a plurality of horizontally spaced apart longitudinal members, including at least one pair of longitudinal members comprising a first longitudinal member and a second longitudinal member horizontally spaced apart from the first longitudinal member, each longitudinal member extending across at least a portion of the cross-sectional area of the exchange column and having at least one inner side, an upper end adjacent the bottom of the layer of packing, and a lower end opposite the upper end;

providing in the exchange column at least one plate vertically spaced apart from the bottom of the layer of packing and extending across at least a portion of the cross-sectional area of the exchange column to collect a first portion of the flow of the liquid descending in the exchange column and having a first end and a second end opposite the first end, the first end of the at least one plate being connected to the inner side of the first longitudinal member and the second end of the at least one plate being connected to the inner side of the second longitudinal member; and providing in the exchange column at least one vapor riser in fluid communication with the at least one plate to receive and transmit at least a portion of a stream of a vapor ascending in the exchange column from a first location below the at least one plate to a second location above the at least one plate, the at least one vapor riser having a cap vertically spaced apart from the bottom of the packing, at least one upright wall connected to the at least one plate and projecting upward above the at least one plate and connecting to the cap, and at least one opening to transmit at least a portion of the stream of the vapor outward from the at least one vapor riser connecting at least one of the at least one plate to an inner wall of the exchange column.

18. A method for assembling an apparatus as in claim 17, wherein at least one of the first longitudinal member and the second longitudinal member structurally supports at least a portion of the layer of packing.

19. A method for assembling an apparatus as in claim 17, comprising the further step of:
providing in the exchange column at least one transfer channel extending across at least a portion of the cross-sectional area of the exchange column to receive and transmit a flow of at least a portion of the liquid collected on the at least one plate.

20. A method for assembling an apparatus as in claim 19, comprising the further step of:

provinding in the exchange column at least one conduit in fluid communication with the at least one transfer channel to receive and transmit at least a portion of the collected liquid from the at least one transfer channel downward in the exchange column.

* * * * *